United States Patent
Schneider (10) Patent No.: US 8,186,714 B2
(45) Date of Patent: May 29, 2012

(54) INFLATABLE AIRBAG ASSEMBLY WITH AN AIRBAG HOUSING VENT PANEL

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 404 days.

(21) Appl. No.: 12/608,828

(22) Filed: Oct. 29, 2009

(65) Prior Publication Data

US 2011/0101663 A1   May 5, 2011

(51) Int. Cl.
*B60R 21/30* (2006.01)
(52) U.S. Cl. .................... 280/739; 280/743.1
(58) Field of Classification Search .......... 280/736, 280/739, 740, 741, 742
See application file for complete search history.

(56) References Cited

U.S. PATENT DOCUMENTS

| | | | |
|---|---|---|---|
| 4,126,325 A | 11/1978 | Weman | |
| 5,246,250 A | 9/1993 | Wolanin et al. | |
| 5,366,242 A | 11/1994 | Faigle et al. | |
| 5,405,166 A | 4/1995 | Rogerson | |
| 6,126,191 A | 10/2000 | Pepperine et al. | |
| 6,139,048 A | 10/2000 | Braunschädel | |
| 6,382,664 B1 * | 5/2002 | Hirano et al. | 280/730.2 |
| 6,550,807 B1 * | 4/2003 | Faigle et al. | 280/739 |
| 6,648,371 B2 * | 11/2003 | Vendely et al. | 280/739 |
| 6,746,045 B2 | 6/2004 | Short | |
| 6,959,945 B2 | 11/2005 | Fischer et al. | |
| 6,991,258 B2 | 1/2006 | Hawthorn et al. | |
| 7,017,945 B2 | 3/2006 | DePottey et al. | |
| 7,036,843 B2 | 5/2006 | Okamoto et al. | |
| 7,261,319 B2 | 8/2007 | DePottey et al. | |
| 7,318,602 B2 | 1/2008 | DePottey et al. | |
| 7,328,915 B2 | 2/2008 | Smith et al. | |
| 7,347,450 B2 | 3/2008 | Williams et al. | |
| 7,413,218 B2 | 8/2008 | Ekdahl | |
| 7,481,456 B2 * | 1/2009 | Nozaki et al. | 280/743.1 |
| 7,494,151 B2 | 2/2009 | Maripudi | |
| 7,543,849 B2 * | 6/2009 | Bradburn | 280/739 |
| 7,584,993 B2 * | 9/2009 | Yamaji et al. | 280/736 |
| 7,597,356 B2 * | 10/2009 | Williams | 280/739 |
| 7,618,059 B2 * | 11/2009 | Hall et al. | 280/736 |
| 7,635,148 B2 * | 12/2009 | Sager | 280/739 |
| 7,731,231 B2 | 6/2010 | Schneider et al. | |

(Continued)

FOREIGN PATENT DOCUMENTS

WO   WO 2008/127756   10/2008

OTHER PUBLICATIONS

Notice of Allowance and Fee(s) Due issued Mar. 25, 2010 in co-pending U.S. Appl. No. 11/786,559, issuing as U.S. Patent No. 7,731,231.

(Continued)

*Primary Examiner* — Faye M. Fleming
(74) *Attorney, Agent, or Firm* — Sally J. Brown; Stoel Rives LLP.

(57) ABSTRACT

Vents in inflatable airbags can be used to soften airbags during deployment by allowing inflation gas to exit from the interior of the airbag. Airbag vents can be used in conjunction with vents in an airbag housing and a vent panel that can align with the airbag vent with the housing vent and cover the aperture of the housing vent.

20 Claims, 11 Drawing Sheets

U.S. PATENT DOCUMENTS

| | | | |
|---|---|---|---|
| 7,731,233 B2 * | 6/2010 | Schneider et al. | 280/739 |
| 7,770,922 B2 * | 8/2010 | Schneider et al. | 280/739 |
| 7,837,228 B2 * | 11/2010 | Abe | 280/743.1 |
| 7,931,299 B2 * | 4/2011 | McFadden et al. | 280/743.2 |
| 2002/0121770 A1 | 9/2002 | Schneider | |
| 2003/0155756 A1 * | 8/2003 | Hawthorn et al. | 280/739 |
| 2003/0209895 A1 | 11/2003 | Gu | |
| 2005/0098991 A1 | 5/2005 | Nagai et al. | |
| 2005/0104347 A1 * | 5/2005 | Hawthorn et al. | 280/739 |
| 2006/0071456 A1 | 4/2006 | Jenkins et al. | |
| 2006/0208472 A1 | 9/2006 | DePottey et al. | |
| 2006/0290119 A1 * | 12/2006 | Thomas et al. | 280/739 |
| 2007/0170709 A1 | 7/2007 | Braun et al. | |
| 2008/0073893 A1 | 3/2008 | Schneider | |
| 2008/0252052 A1 | 10/2008 | Schneider et al. | |
| 2008/0252053 A1 | 10/2008 | Schneider et al. | |
| 2010/0052298 A1 | 3/2010 | Schneider et al. | |
| 2010/0140908 A1 * | 6/2010 | Abe | 280/739 |
| 2011/0079988 A1 * | 4/2011 | Bauer et al. | 280/728.1 |
| 2011/0101663 A1 * | 5/2011 | Schneider | 280/743.1 |

OTHER PUBLICATIONS

Notice of Allowance and Fee(s) Due issued Mar. 23, 2010 in co-pending U.S. Appl. No. 12/133,267, issuing as U.S. Patent No. 7,731,233.
Notice of Allowance and Fee(s) Due issued Apr. 7, 2010 in co-pending U.S. Appl. No. 12/204,626, issuing as U.S. Patent No. 7,770,922.
Supplemental Notice of Allowance issued Jun. 16, 2010 in co-pending U.S. Appl. No. 12/204,626, issuing as U.S. Patent No. 7,770,922.
Co-pending U.S. Appl. No. 12/843,708, titled Inflatable Airbag Assembly With an Airbag Housing Vent Panel, filed Jul. 26, 2010.
Notification of Transmittal of the International Search Report and the Written Opinion of the International Searching Authority issued Aug. 1, 2008 in International Application No. PCT/US2008/052254.
Restriction Requirement issued Mar. 9, 2009 in co-pending U.S. Appl. No. 12/133,267.
Response to Requirement for Election of Species filed Apr. 9, 2009 in co-pending U.S. Appl. No. 12/133,267.
Office Action issued May 15, 2009 in co-pending U.S. Appl. No. 12/133,267.
Amendment and Response to Office Action filed Nov. 16, 2009 in co-pending U.S. Appl. No. 12/133,267.
Notice of Allowance and Fee(s) Due issued Feb. 9, 2010 in co-pending U.S. Appl. No. 12/133,267.
Request for Continued Examination filed Mar. 2, 2010 in co-pending U.S. Appl. No. 12/133,267.
Restriction Requirement issued Mar. 9, 2009 in co-pending U.S. Appl. No. 11/786,559.
Response to Requirement for Election of Species filed Apr. 9, 2009 in co-pending U.S. Appl. No. 11/786,559.
Office Action issued May 15, 2009 in co-pending U.S. Appl. No. 11/786,559.
Amendment and Response to Office Action and Terminal Disclaimer filed Nov. 16, 2009 in co-pending U.S. Appl. No. 11/786,559.
Approval of Terminal Disclaimer issued Nov. 16, 2009 in co-pending U.S. Appl. No. 11/786,559.
Notice of Allowance and Fee(s) Due issued Feb. 8, 2010 in co-pending U.S. Appl. No. 11/786,559.
Request for Continued Examination filed Mar. 4, 2010 in co-pending U.S. Appl. No. 11/786,559.
Office Action issued Sep. 4, 2009 in co-pending U.S. Appl. No. 12/204,626.
Amendment and Response to Office Action filed Mar. 2, 2010 in co-pending U.S. Appl. No. 12/204,626.
Office Action mailed Dec. 14, 2011 in co-pending U.S. Appl. No. 12/843,708.

* cited by examiner

INFLATABLE AIRBAG ASSEMBLY WITH AN AIRBAG HOUSING VENT PANEL

TECHNICAL FIELD

The present disclosure relates generally to the field of automotive safety systems. More specifically, the present disclosure relates to inflatable airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in this packaged configuration behind a cover. During a collision event, vehicle sensors trigger the activation of an inflator, which rapidly fills the airbag with inflation gas. Thus the airbag rapidly changes confirmations from the packaged configuration to an expanded configuration.

Figure 1A:
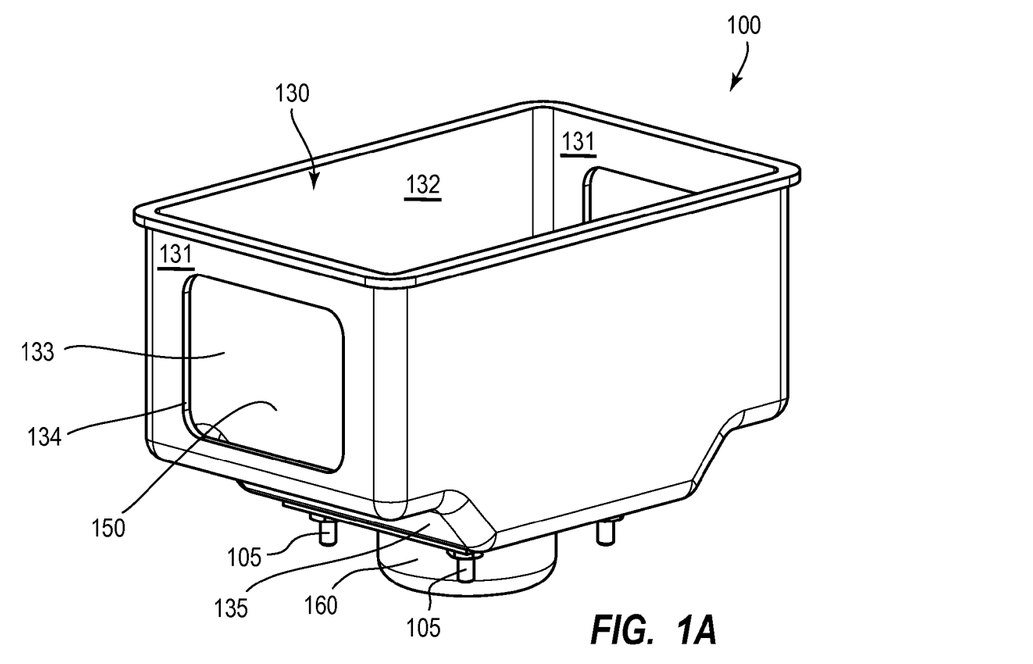
FIG. 1A is a perspective view of one embodiment of an inflatable airbag housing with a vent.
Figure 1B:
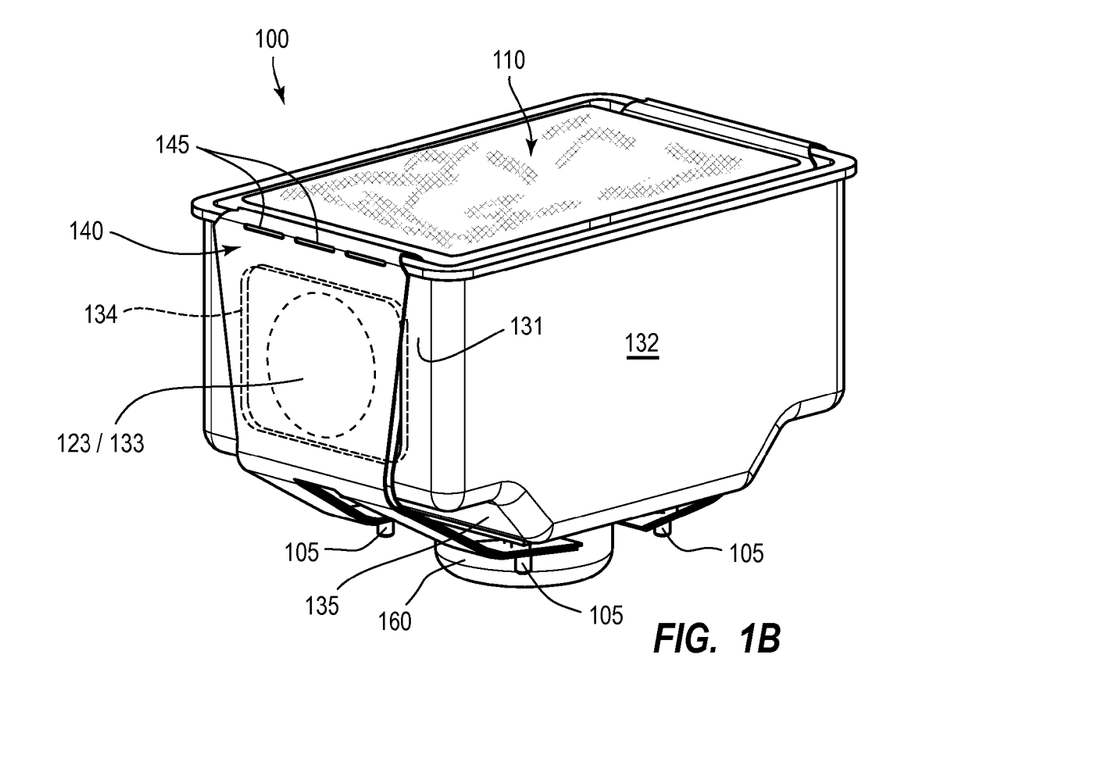
FIG. 1B is a perspective view of the airbag housing of FIG. 1A after an airbag has been placed within the housing and a vent panel has been fitted over the housing vent.

FIGS. 1A-1B illustrate perspective views of airbag assembly 100. Airbag assembly 100 may comprise an inflatable cushion membrane 110, a housing 130, a vent panel 140, and an inflator 160. Airbag housing 130 may comprise a metal container that is fixedly attached to cushion 110 via a throat portion of the cushion. Airbag housing 130 is configured to be mounted within a vehicle and serves to specifically position airbag assembly 100 so that the cushion may deploy with predetermined characteristics. In the packaged, undeployed state, cushion 110 is contained within housing 130. In other embodiments, housing 130 may comprise one or more plastic portions; one or more composite materials, or a combination of metal, plastic, and composite materials. Airbag housing 130 may comprise two opposing lateral sidewalls 131, two opposing longitudinal sidewalls 132, and a bottom wall 135. Lateral sidewalls 131 may each comprise an aperture 133, defined by a perimeter 134. Apertures 133 are each configured to be aligned with an aperture 123 of a vent located on inflatable airbag 110.

Vent panel 130 is coupled to inflatable airbag 110 and is aligned with vent aperture 123. Vent panel 130 is also coupled to airbag housing 130 at mounting structures 105 that may be employed to couple together the airbag, housing, vent panel, and inflator. Mounting structures 105 is located on bottom wall 135 of housing 130. Vent panel 140 is configured to retain apertures 123 and 133 of airbag 110 and housing 130 in the aligned configuration as well as block objects from entering the airbag or the housing via their apertures, when the airbag assembly is in the packaged configuration. Vent panel 140 also comprises a plurality of rupture seams, wherein one of the rupture seams 145 is located next to a rim 136 of housing 130. Vent panel 140 is configured such that during inflatable airbag deployment, the vent panel ruptures and allows airbag 110 to exit airbag housing 130 and fully deploy.

Figure 2:
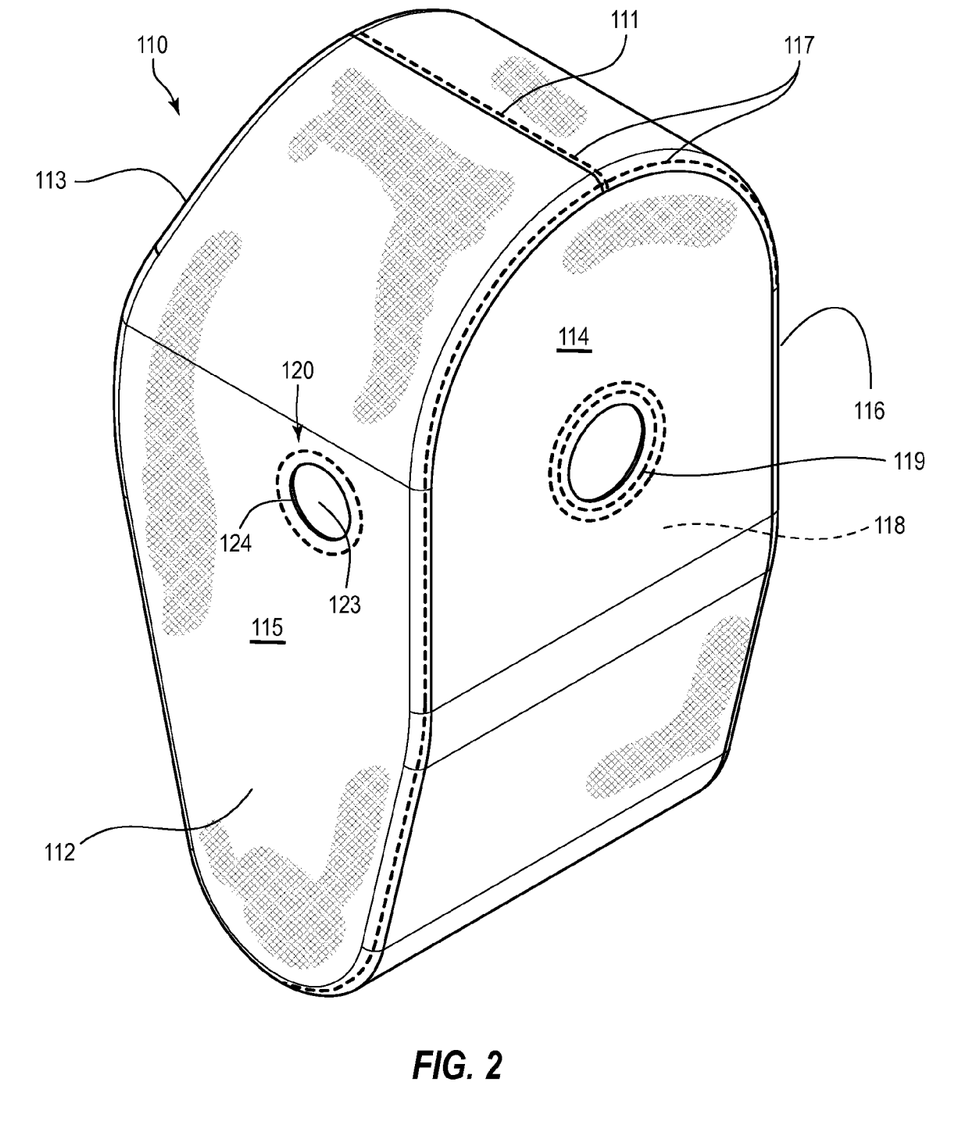
FIG. 2 is a perspective view of an embodiment of an inflatable airbag.

FIG. 2 depicts a perspective view of one embodiment of inflatable airbag 110, which may have an upper portion 111, a lower portion 112, a front face 113, a rear face 114, a first side face 115, a second side face 116, and a throat portion 119. The various faces of cushion membrane 110 define an interior inflatable void 118, which is in fluid communication with the inflator (not shown). The various faces of cushion 110 may be attached to each other using seams 117 that comprise stitching.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Vent 120 may be located on one or both of the side faces 115 and 116, such that airbag 110 may comprise a single vent or a plurality of vents. Vent 120 is configured to allow inflation gas to pass from inflatable void 118 of airbag 110 to outside the airbag. Vent 120 may comprise aperture 123 defined by a perimeter 124. Vent 120 may comprise a discreet vent or a dynamic vent. Discreet vents are configured such that they do not change configuration or diameter during inflatable airbag deployment, whereas dynamic vents are configured such that they can change configuration during the course of airbag deployment. Dynamic vents may remain open during airbag deployment or may adopt an open configuration if an obstruction such as an out of position occupant is encountered during airbag deployment.

For example, the dynamic vent may be configured to change from an open state during initial airbag deployment to an at least partially closed state later in airbag deployment. Alternatively, the vent may deploy in a closed configuration and adopt an open state during the course of airbag deployment, and then become closed again at a later stage of airbag deployment, unless an obstruction is encountered in which case the vent may remain open. One type of closeable vent that may be used is a cinch tube vent of the type found in U.S. Pat. No. 7,347,450, which is hereby incorporated by reference. The relative size, shape, and location of vent 120 as depicted in FIG. 2 is for illustrative purposes only, and may be varied for use with different airbags and/or different vehicle environments.

Figure 3:
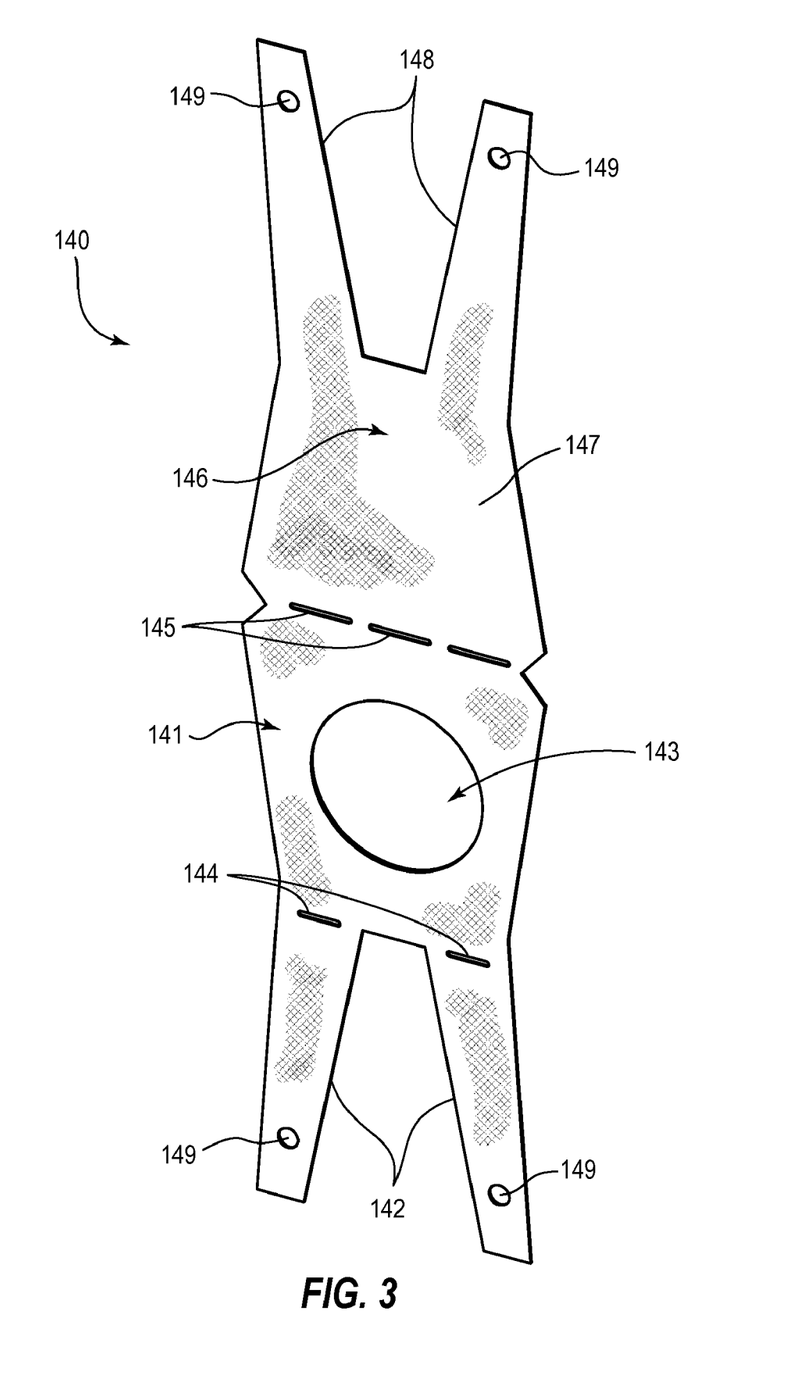
FIG. 3 is a perspective view of an embodiment of a vent panel.

FIG. 3 is a perspective view of an embodiment of vent panel 140. As described above, vent panel 140 is configured to achieve multiple functions; it is configured to block objects from entering the airbag or the housing via their apertures; retain the apertures of the housing and the airbag vents in the aligned configuration; and allow the airbag to achieve a fully deployed, fully inflated configuration. Vent panel 140 may comprise first side 141 and second side 146 that are separated by a rupture seam 145, which may comprise perforations.

First side 141 may comprise a plurality of extensions 142, which may be called "legs". Legs 141 may each comprise a rupture seam 144. First side 141 may also comprise aperture 143. Second side 146 may comprise a body portion 147 and extensions 148, which may also be called "legs". Legs 142 and 148 may each comprise a mounting structure 149, which in the depicted embodiment, is an aperture. In the depicted embodiment, vent panel 140 comprises two rupture seams but it may comprise more rupture seams.

Figure 4:
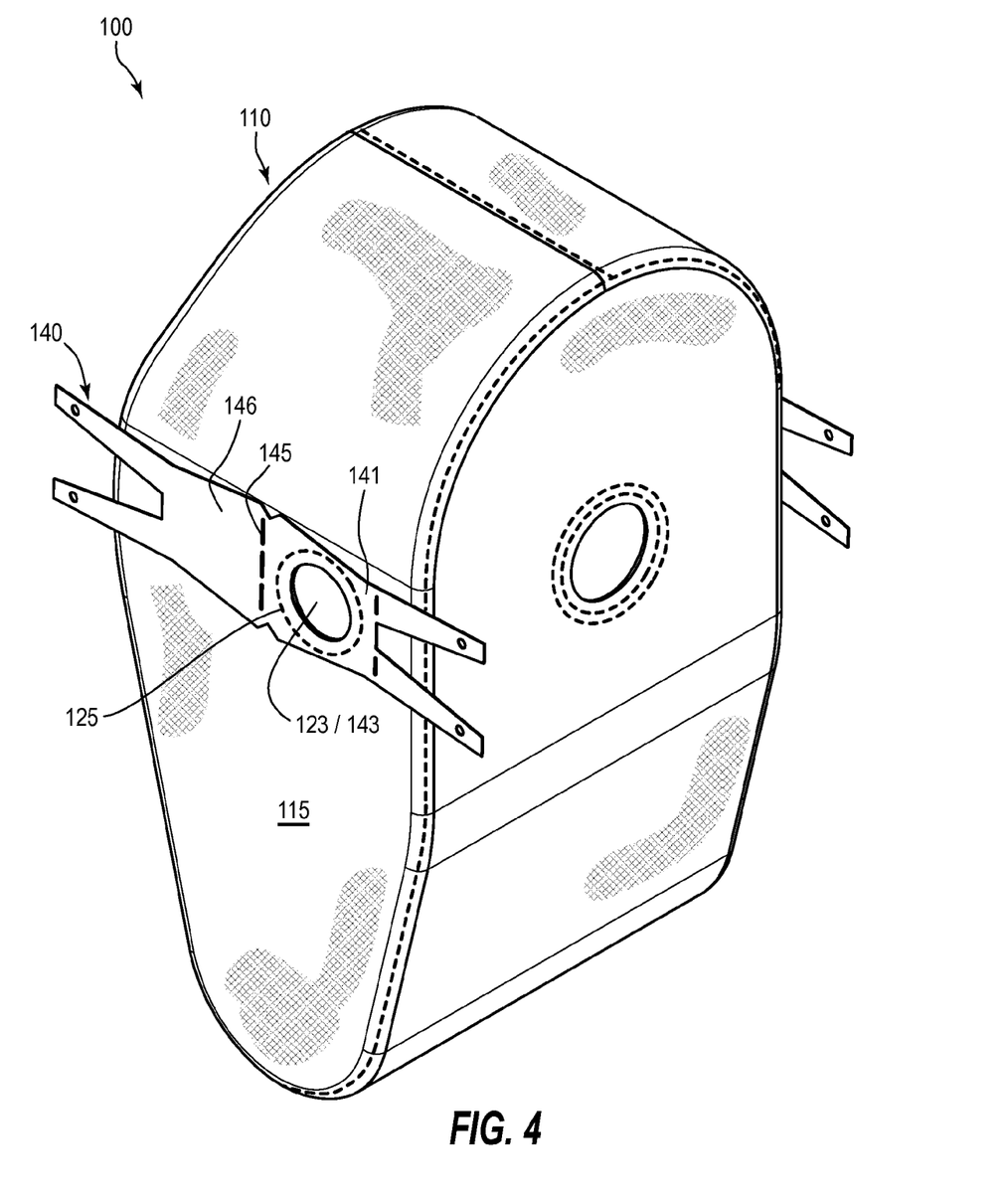
FIG. 4 is a perspective view of the inflatable airbag of FIG. 2 and the vent panel of FIG. 3 after the airbag and the vent panel have been coupled together.

FIG. 4 is a perspective view of a portion of airbag assembly 100, wherein vent panel 140 has been coupled to inflatable airbag 110. Vent panel 140 and inflatable airbag 110 are coupled together around the perimeters of apertures 123 and 143 at a perimeter seam 125, which in the depicted embodiment comprises stitching. As such, apertures 123 and 143 are placed in alignment and retained in alignment. First side 141 of vent panel 140 is attached to side face 115 of airbag 110. Second side 146 of vent panel 140 is not attached to airbag 110, except via first side 141. Rupture seam 145 is located between second side 146 of the vent panel and seam 125.

Figure 5A:
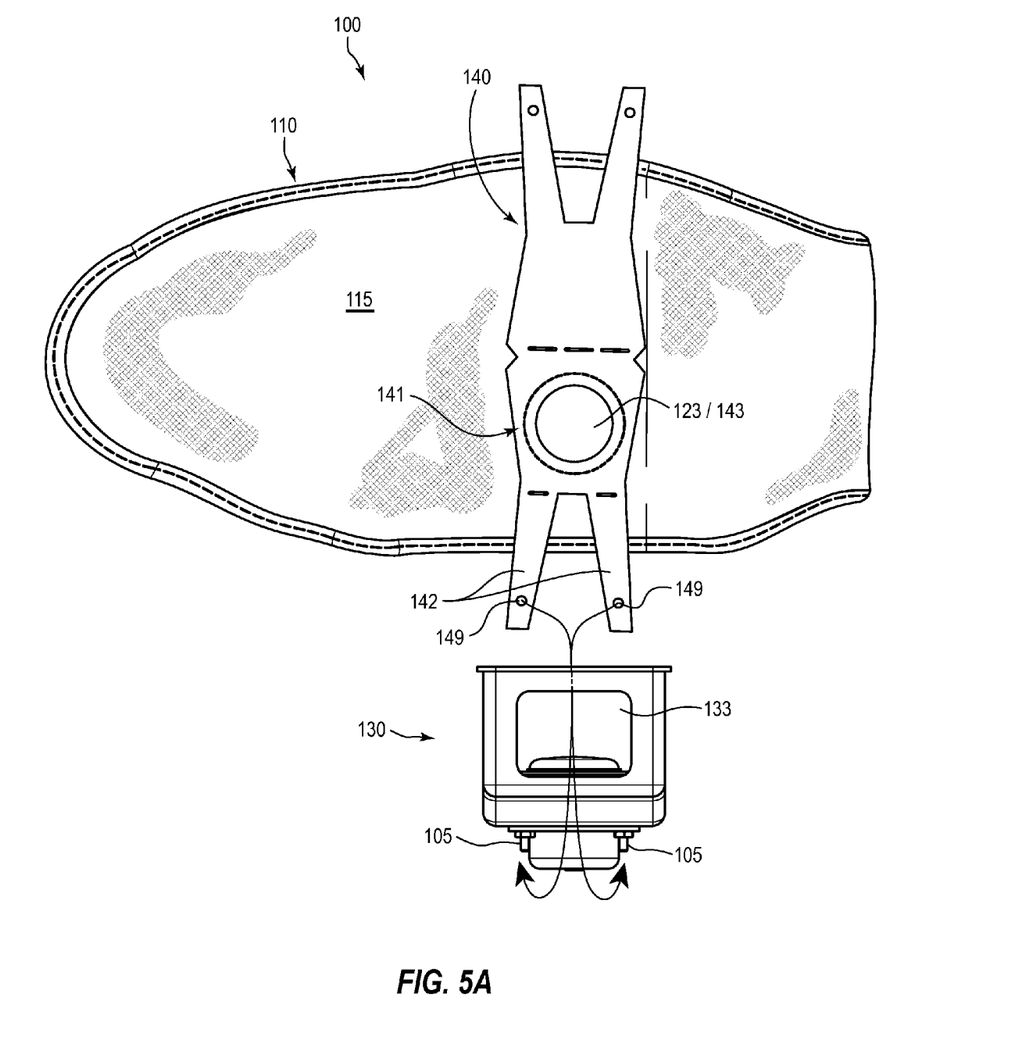
FIG. 5A is a perspective view of an airbag assembly before the airbag and vent panel have been coupled to the airbag housing.
Figure 5B:
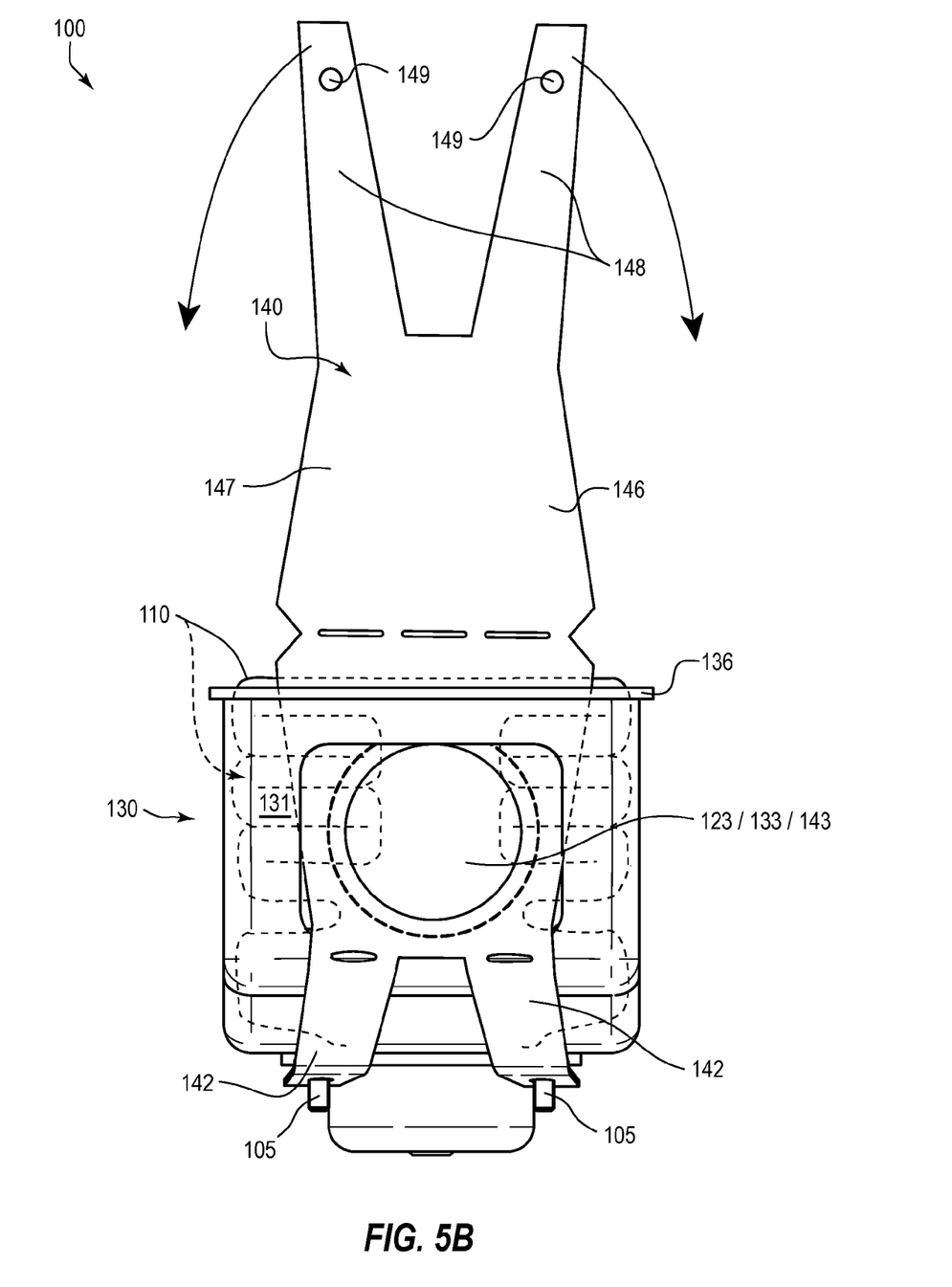
FIG. 5B is a perspective view of the airbag assembly of FIG. 5A after the airbag and a portion of the vent panel have been coupled to the airbag housing.
Figure 5C:
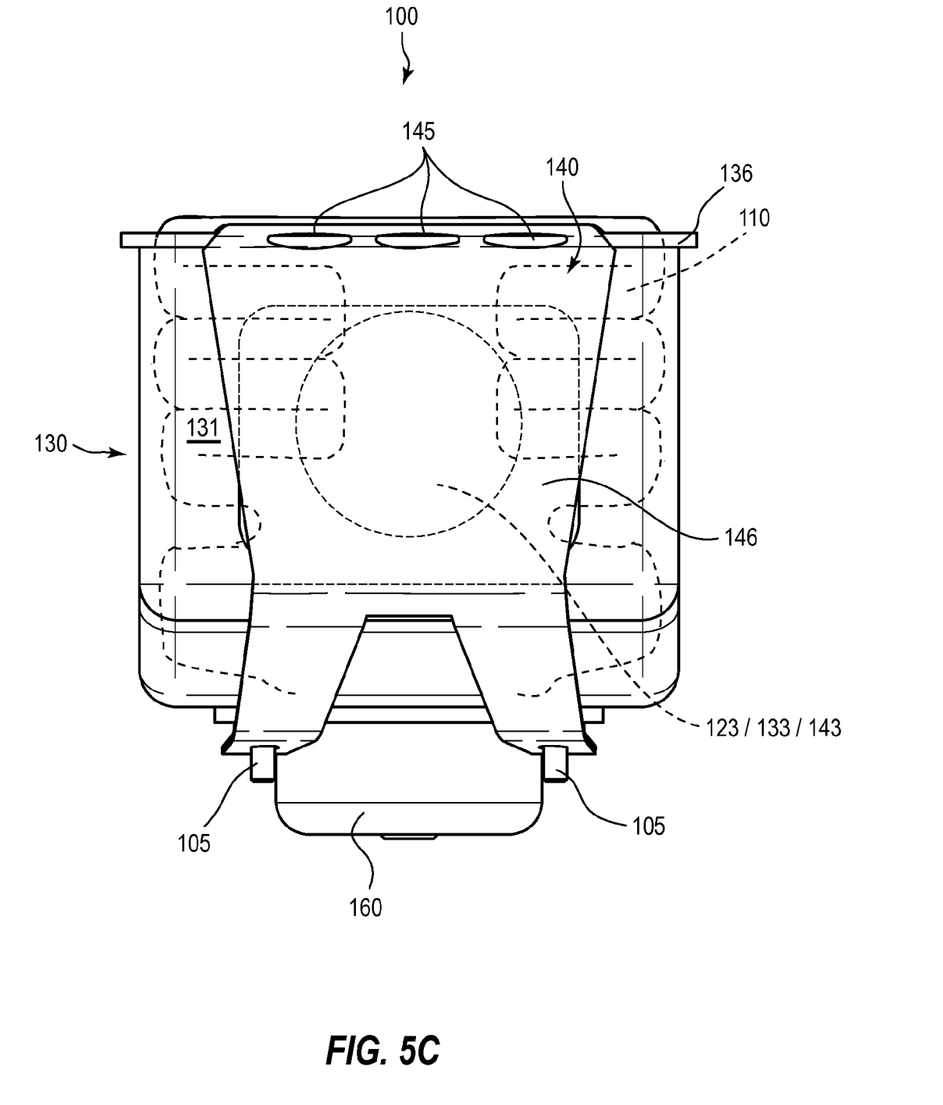
FIG. 5C is a perspective view of the airbag assembly of FIG. 5B after the vent panel has been coupled to the airbag housing.

FIGS. 5A-5C are side perspective views of airbag assembly 100, wherein in FIG. 5A, airbag 100 and vent panel 140 are not yet coupled to housing 130; in FIG. 5B, airbag 110 and vent panel 140 are partially coupled to housing 130; and in FIG. 5C, airbag 110 and vent panel 140 are in the packaged configuration. FIGS. 5A-5C may be said to depict a method for coupling a vent panel to an airbag housing; a method for aligning an airbag vent with a housing vent; and/or a method for blocking an airbag and housing vent prior to airbag deployment.

FIG. 5A depicts assembly 100, wherein first side 141 of vent panel 140 has been coupled to side face 115 such that apertures 123 and 143 are at least partially aligned. Legs 142 are configured to be placed through aperture 133 of housing 130 and each of the apertures 149 of the legs are placed over mounting structures 105 of the housing.

FIG. 5B depicts assembly 100 after legs 142 have been placed through aperture 144 of lateral sidewall 131 of housing 130 and each of the apertures 149 of the legs are placed over mounting structures 105 of the housing. Second side 146 is configured to be folded over a rim 136 of housing 130 such that body 147 of vent panel 140 covers the outside of apertures 123, 133, and 143. Legs 148 are configured to extend underneath housing 130 and be attached to mounting structures 105 via apertures 149.

FIG. 5C is a depiction of assembly 100 after the assembly has been placed in the packaged configuration. Airbag 110 has been rolled and/or folded and placed within housing 130. Vent panel 140 has been placed through aperture 133 in lateral sidewall 131 of housing 130, and has been coupled to the housing via mounting structures 105, which may also couple inflator 160 to the housing. Second side 146 of vent panel 140 is blocking apertures 123 and 143. Rupture seam 145 is located on vent panel 140 such that when the vent panel is in the packaged configuration, the rupture seam is located adjacent to rim 136 of housing 130.

Figure 6A:
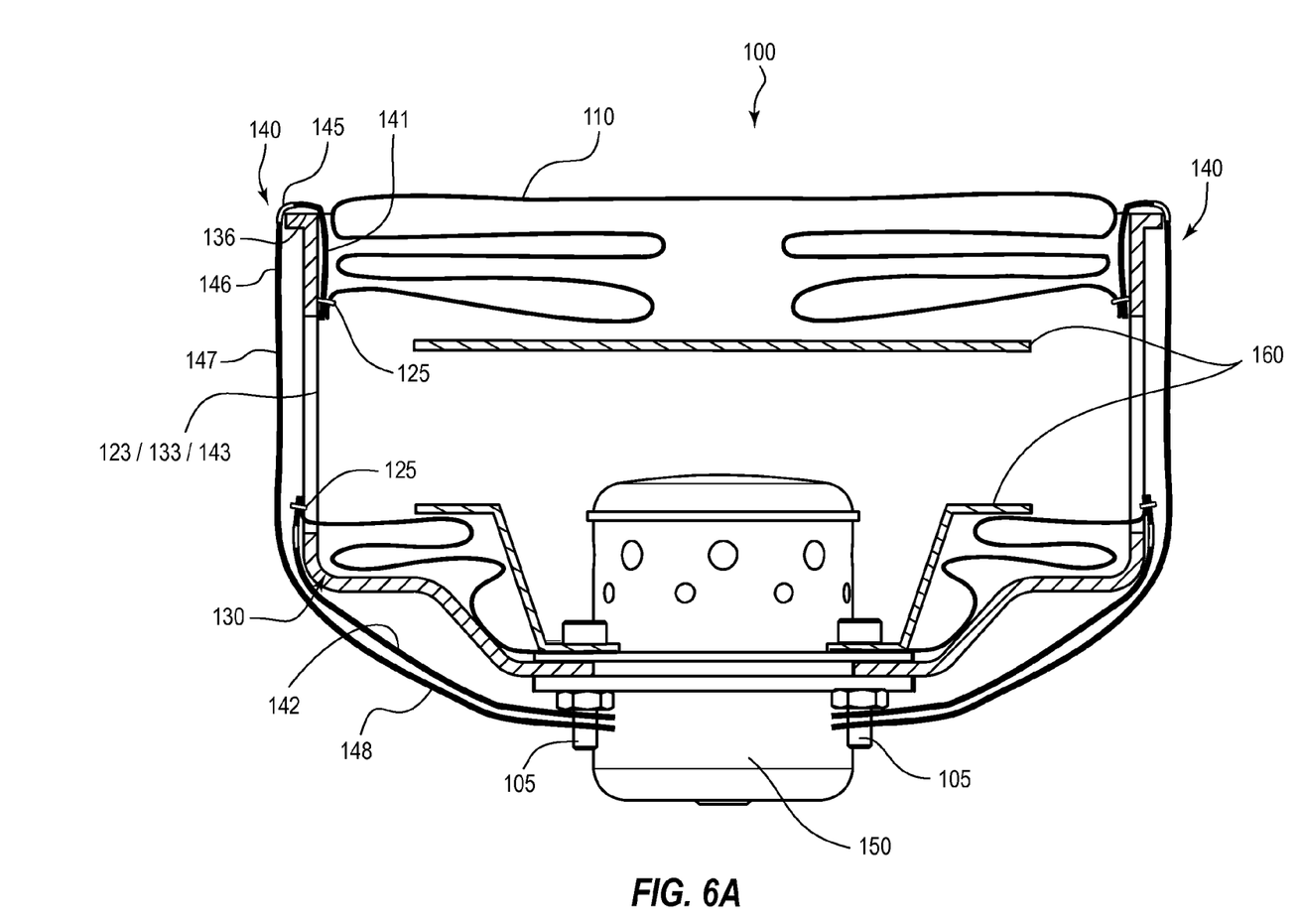
FIG. 6A is a cross-sectional view of the airbag assembly of FIG. 5C.
Figure 6B:
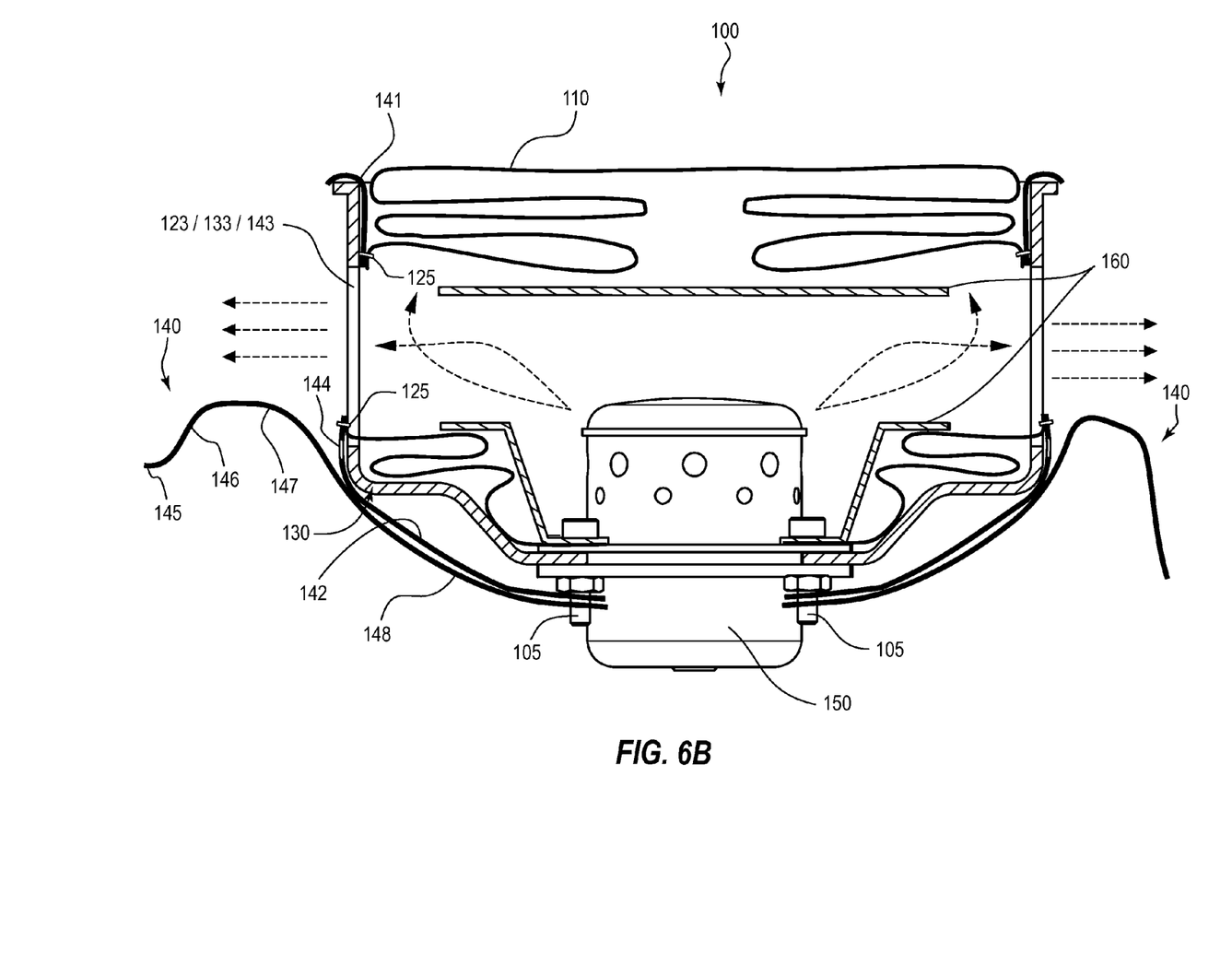
FIG. 6B is a cross-sectional view of the airbag assembly of FIG. 6A, wherein the airbag assembly is in an early stage of airbag deployment.
Figure 6C:
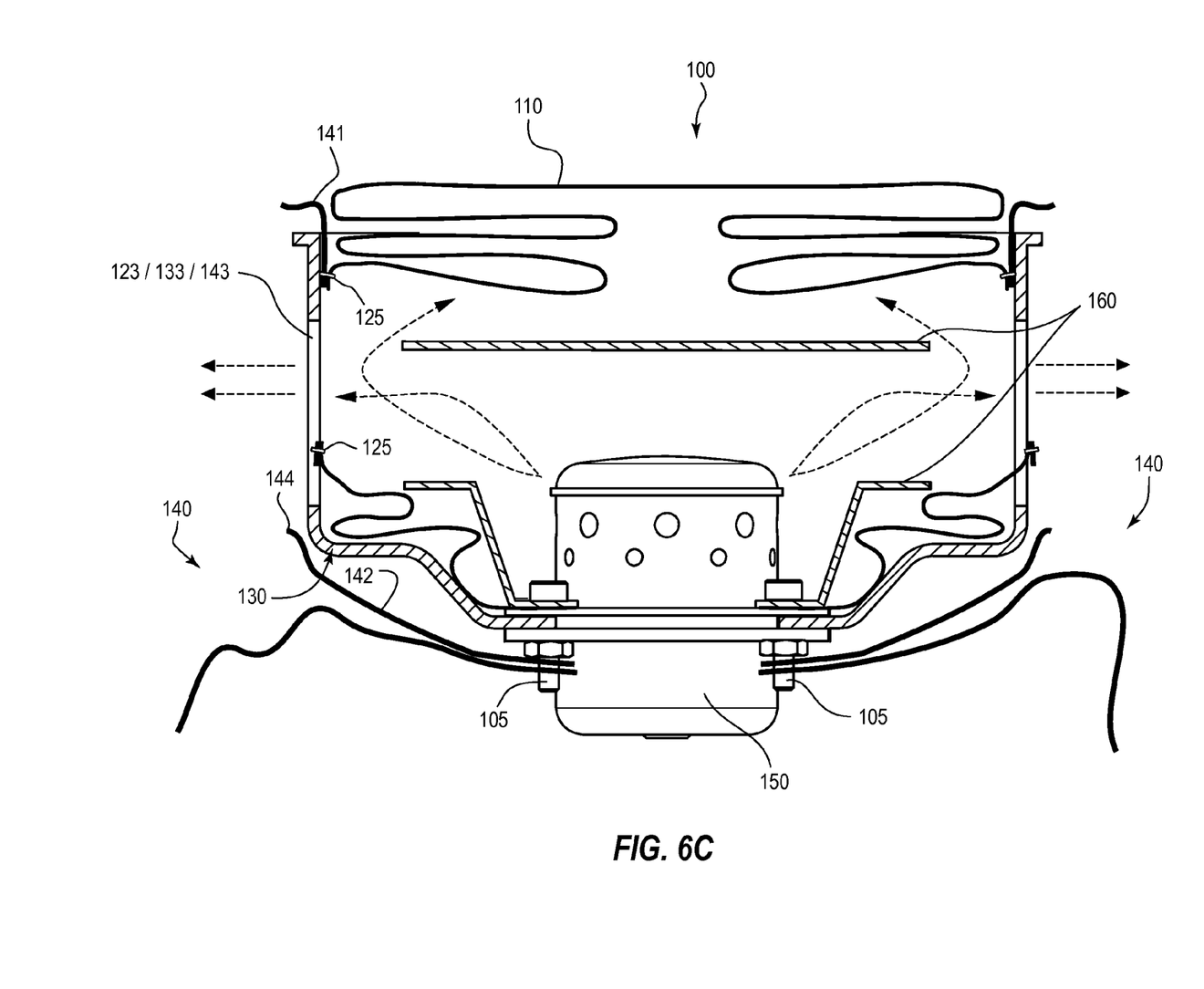
FIG. 6C is a cross-sectional view of the airbag assembly of FIG. 6B, wherein the airbag assembly is in a mid-stage of airbag deployment.
Figure 6D:
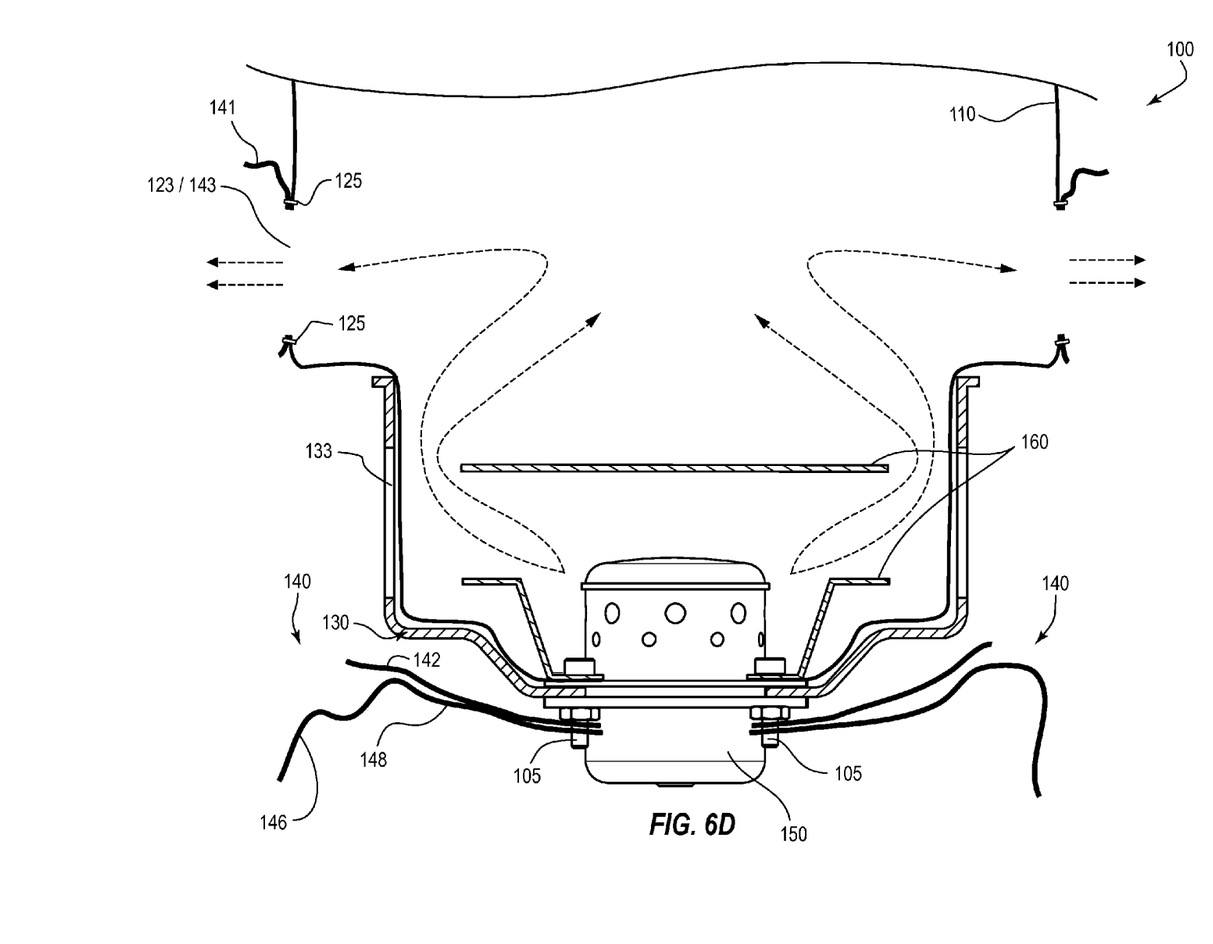
FIG. 6D is a cross-sectional view of the airbag assembly of FIG. 6C, wherein the airbag assembly is in a late stage of airbag deployment.

FIGS. 6A-6D are cross-sectional views of assembly 100, wherein FIG. 6A depicts the assembly before initiation of the inflator; FIG. 6B depicts assembly 100 in an early stage airbag deployment; FIG. 6C depicts assembly 100 in a mid-stage of airbag deployment; and FIG. 6D depicts assembly 100 in a late stage of airbag deployment. The terms, "early," "mid-," and "late" stages of airbag deployment are not intended to indicate specific stages or elapsed times of airbag deployment; rather, the terms are meant to indicate a general sequential progression of airbag deployment. In the depictions of FIGS. 6A-6D, inflatable airbag 110, housing 130, inflator 150 and diffuser 160 are coupled together via mounting structures 105. Diffuser 160 is an optional component of assembly 100.

FIG. 6A depicts a cross-sectional illustration assembly 100 in the packaged configuration. Airbag 110 has been rolled and/or folded and attached to vent panel 140 at seam 125, which may comprise stitching, such that apertures 123, 133, and 143 are at least partially aligned. An upper portion of first side 141 of vent panel 140 is on an inside of housing 130 and a lower portion of first side 141, such as legs 142 are on an outside of housing 130. Legs 142 extend to, and are coupled to mounting structures 105. Second side 146 of vent panel 140 is on the outside of housing 140 and body 147 of the second side is blocking apertures 123, 133, and 143. Legs 148 extend to, and are coupled to mounting structures 105. Rupture seam 145 is located adjacent to rim 136 of housing 130. Diffuser 160 may comprise a fabric component that comprises a plurality of apertures. Some of the apertures of diffuser 160 may be configured such that early in airbag deployment, the diffuser directs inflation gas toward apertures 123.

FIG. 6B depicts assembly 100 after inflator 150 has been initiated and inflation gas (depicted as arrows) has begun to be generated and/or released by the inflator. FIG. 6B may also be said to depict assembly 100 at an early stage of airbag deployment. Early in airbag deployment, airbag 110 may not exit housing 130, but may begin to become inflated. Inflation gas is at least partially directed towards apertures 123, 133, and 143 such that inflation gas can exit the interior of airbag 110. In this way, out of position occupants or other obstructions may receive less energy from airbag 110 during deployment.

Upon initiation of inflator 150, inflation gas places tension on body 147 of second portion 146 of vent panel 140, such that rupture seam 145 ruptures, thereby causing the body portion to cease blocking apertures 123, 133, and 143. When rupture seam 145 fails, second side can fall away, but may be retained on housing 130 via mounting structure 105 and leg 148. Rupture seam 144 may not rupture early in airbag deployment such that legs 142 remain in the packaged configuration. The upper portion of first side 141 may remain attached to airbag 110.

FIG. 6C is a cross-sectional diagram of assembly 100 in a mid-stage of inflatable airbag deployment, wherein airbag 110 may begin to exit housing 130 and aperture 123 of airbag 110 may become partially misaligned with housing vent aperture 133. Vent aperture 143 of first side 141 of vent panel 140 may be retained in the aligned configuration with vent 123 via perimeter seam 125. When airbag 110 begins to expand outwardly, away from housing 130, tension may be placed on rupture seam 144 that is sufficient to rupture the seam and allow legs 142 to become separated from first side 141. As such, it may be said that legs 142 and/or 148 cease to retain vent panel 140 and airbag 110 in the packaged configuration. In mid-airbag deployment, it may be said that vent panel 140 ceases to inhibit, or does not inhibit the outward expansion of airbag 110.

FIG. 6D is a cross-sectional view of assembly 110 in a later stage of inflatable airbag deployment, wherein inflatable airbag 110 is in a deployed, extended configuration. Vent apertures 123 and 143 of airbag 110 and vent panel 140 have become misaligned with vent aperture 133 in housing 130. As such, inflation gas may be primarily directed into the inflatable void of airbag 110; however inflation gas may continue to exit the inflatable void via vent apertures 123 and 143. Vent panel 140 may be ruptured such that it comprises three pieces: first side 141 comprising aperture 143 may be retained on airbag 110 via perimeter seam 125; legs 142 may be retained coupled to housing 130 via mounting structure 105; and second side 146, including legs 148 may be retained coupled to housing 130 via mounting structure 105.

Assembly 100 may deploy, wherein the airbag encounters an obstruction, such as an out of position occupant. If the airbag encounters an obstruction, the airbag may not fully expand, but rather may remain in a partially rolled and/or folded configuration, wherein the airbag does not achieve a fully extended configuration. This may be described as deployment with obstruction. In the occurrence of deployment with obstruction, the vent panel may not rupture at all of rupture seams present on the vent panel. Alternatively, during deployment, the airbag may not encounter an obstruction, such as an out of position occupant. In this occurrence, the airbag may achieve a fully extended and inflated configuration, wherein the vent panel ruptures at the rupture seams.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an airbag housing having a vent aperture;
   a vent panel coupled to the airbag housing, wherein the vent panel covers the vent aperture of the airbag housing; and
   an inflatable airbag coupled to the vent panel, wherein the inflatable airbag has a vent aperture,
   wherein the vent panel aligns the inflatable airbag vent aperture and the airbag housing vent aperture and wherein in a packaged configuration, the vent panel retains the vent apertures in the aligned configuration, and wherein during initial inflatable airbag deployment, the vent panel continues to retain the inflatable airbag vent aperture and the airbag housing vent aperture in the aligned configuration, and wherein during inflatable airbag deployment with obstruction, the vent panel continues to retain the inflatable airbag vent aperture and the airbag housing vent aperture in the aligned configuration, and wherein during inflatable airbag deployment without obstruction, the vent panel ceases to retain the inflatable airbag vent aperture and the airbag housing vent aperture in the aligned configuration.

2. The inflatable airbag assembly of claim 1, wherein when the assembly is in the packaged configuration, the vent panel blocks debris from entering the inflatable airbag via the airbag vent aperture.

3. The inflatable airbag assembly of claim 1, wherein the vent panel extends through the vent aperture of the airbag housing.

4. The inflatable airbag assembly of claim 1, wherein a portion of the vent panel is configured to rupture during inflatable airbag deployment.

5. The inflatable airbag assembly of claim 1, wherein during inflatable airbag deployment, a portion of the vent panel is retained on the inflatable airbag and another portion is retained on the airbag housing.

6. An inflatable airbag assembly, comprising:
an airbag housing having a vent aperture;
a plurality of mounting stems coupled to the bottom wall of the airbag housing;
an inflator coupled to the bottom wall of the airbag housing via the mounting stems;
a vent panel coupled to the bottom wall of the airbag housing via the mounting stems, wherein the vent panel covers the vent aperture of the airbag housing on an exterior side of the airbag housing vent aperture; and,
an inflatable airbag coupled to the vent panel, wherein the inflatable airbag has a vent aperture,
wherein the vent panel aligns the inflatable airbag vent aperture and the airbag housing vent aperture and wherein in a packaged configuration, the vent panel retains the vent apertures in the aligned configuration, and
wherein during initial inflatable airbag deployment, the vent panel continues to retain the inflatable airbag vent aperture and the airbag housing vent aperture in the aligned configuration, and
wherein during inflatable airbag deployment with obstruction, the vent panel continues to retain the inflatable airbag vent aperture and the airbag housing vent aperture in the aligned configuration, and
wherein during inflatable airbag deployment without obstruction, the vent panel ceases to retain the inflatable airbag vent aperture and the airbag housing vent aperture in the aligned configuration.

7. The inflatable airbag assembly of claim 6, wherein the vent panel is coupled to the inflatable airbag at a perimeter of the inflatable airbag vent aperture.

8. The inflatable airbag assembly of claim 6, wherein the vent panel comprises a first side and a second side, and wherein in the packaged configuration, the first side is partially located on an interior side of the airbag vent aperture and partially located on an exterior side of the airbag vent aperture.

9. The inflatable airbag assembly of claim 6, wherein the vent panel comprises a rupture seam.

10. The inflatable airbag assembly of claim 9, wherein the rupture seam is configured to fail upon initiation of the inflator, such that the vent panel ceases to cover the airbag housing vent aperture.

11. The inflatable airbag assembly of claim 9, wherein the vent panel comprises a second rupture seam configured to allow the inflatable airbag to adopt a fully deployed configuration.

12. An inflatable airbag assembly, comprising:
an airbag housing having opposing lateral sidewalls, opposing longitudinal sidewalls, and a bottom wall, wherein the lateral sidewalls comprise a vent aperture;
a plurality of mounting stems coupled to the bottom wall of the airbag housing;
an inflatable airbag coupled to the bottom wall of the airbag housing, the inflatable airbag having a vent aperture; and,
a vent panel, comprising:
a first side comprising a vent aperture, wherein the first side is coupled to the mounting stems at an exterior of the bottom wall of the airbag housing, extends through the vent aperture of the airbag housing, and is coupled to the inflatable airbag at a perimeter of the inflatable airbag vent aperture, such that the vent aperture of the first side is at least partially aligned with the vent aperture of the inflatable airbag vent aperture;
a middle portion adjacent to the first side, wherein the middle portion is partially wrapped around a rim of the lateral sidewall; and,
a second side adjacent to the middle portion and opposite the first side, wherein the second side is coupled to the mounting stems at the exterior of the bottom wall of the airbag housing, the second side comprising a body that covers an exterior side of the vent aperture of the airbag housing,
wherein during initial inflatable airbag deployment, the vent panel continues to retain the inflatable airbag vent aperture and the airbag housing vent aperture in the aligned configuration, and
wherein during inflatable airbag deployment with obstruction, the vent panel continues to retain the inflatable airbag vent aperture and the airbag housing vent aperture in the aligned configuration, and
wherein during inflatable airbag deployment without obstruction, the vent panel ceases to retain the inflatable airbag vent aperture and the airbag housing vent aperture in the aligned configuration.

13. The inflatable airbag assembly of claim 12, wherein the middle portion comprises a rupture seam.

14. The inflatable airbag assembly of claim 13, wherein the rupture seam comprises perforations.

15. The inflatable airbag assembly of claim 12, wherein the vent panel first side comprises a mounting member that extends from the vent panel vent aperture to the mounting stems on the bottom side of the airbag housing.

16. The inflatable airbag assembly of claim 15, wherein the mounting member of the first side comprises a second rupture seam.

17. The inflatable airbag assembly of claim 16, wherein the wherein the vent panel second side comprises a mounting member that extends from the body of the second side to the mounting stems on the bottom side of the airbag housing.

18. The inflatable airbag assembly of claim 12, wherein the vent panel second side comprises a mounting member that extends from the body of the second side to the mounting stems on the bottom side of the airbag housing.

19. The inflatable airbag assembly of claim 17, wherein after the inflatable airbag has been deployed, part of the middle portion and part of the first side of the vent panel are coupled to the inflatable airbag.

20. The inflatable airbag assembly of claim 17, wherein after the inflatable airbag has been deployed, part of the middle portion, the body of the second side, and the mounting members of the first and second sides are coupled to the airbag housing.

* * * * *